United States Patent
Jin et al.

(10) Patent No.: US 11,496,502 B2
(45) Date of Patent: Nov. 8, 2022

(54) METHOD AND APPARATUS FOR GENERATING ATTACK STRING

(71) Applicant: SPARROW CO., LTD, Seoul (KR)

(72) Inventors: Min Sik Jin, Seoul (KR); Jong Won Yoon, Seoul (KR); Jong Hwan Im, Seoul (KR)

(73) Assignee: Sparrow Co., Ltd., Seoul (KR)

( * ) Notice: Subject to any disclaimer, the term of this patent is extended or adjusted under 35 U.S.C. 154(b) by 571 days.

(21) Appl. No.: 16/318,476

(22) PCT Filed: Jul. 28, 2016

(86) PCT No.: PCT/KR2016/008263
§ 371 (c)(1),
(2) Date: Jan. 17, 2019

(87) PCT Pub. No.: WO2018/016669
PCT Pub. Date: Jan. 25, 2018

(65) Prior Publication Data
US 2019/0297107 A1    Sep. 26, 2019

(30) Foreign Application Priority Data
Jul. 19, 2016  (KR) .......................... 10-2016-0091242

(51) Int. Cl.
*H04L 29/06* (2006.01)
*H04L 9/40* (2022.01)

(52) U.S. Cl.
CPC ........ *H04L 63/1433* (2013.01); *H04L 63/145* (2013.01); *H04L 63/1416* (2013.01); *H04L 63/1458* (2013.01); *H04L 63/1466* (2013.01)

(58) Field of Classification Search
CPC ............. H04L 63/1433; H04L 63/1416; H04L 63/145; H04L 63/1458; H04L 63/1466
See application file for complete search history.

(56) References Cited

U.S. PATENT DOCUMENTS 8,656,495 B2    2/2014  Sima et al.
9,449,190 B2 *  9/2016  Centonze ............ G06F 21/6227
(Continued)

FOREIGN PATENT DOCUMENTS

| CN | 102136051 A | 7/2011 |
|---|---|---|
| JP | 2008135029 | 6/2008 |
| KR | 20080044145 | 5/2008 |

OTHER PUBLICATIONS

International Search Report for PCT/KR2016/008263 dated Apr. 13, 2017.

*Primary Examiner* — Joseph P Hirl
*Assistant Examiner* — Chi D Nguy
(74) *Attorney, Agent, or Firm* — AJU Kim Chang & Lee

(57) ABSTRACT

Disclosed is an operation method for a dynamic analyzer for analyzing an execution state of a web application. The present invention comprises the steps of: analyzing an execution state of the web application on the basis of a final attack string including a parameter which indicates a particular operation to be executed through the web application; and performing an analysis of the execution state of the web application, wherein the final attack string is generated so as to avoid filtering logic which is designed to filter a raw attack string including a predefined parameter. Therefore, the present invention can detect a security vulnerability, which cannot be detected by the existing dynamic analyzer, through easy generation of a final attack string capable of bypassing filtering.

6 Claims, 5 Drawing Sheets

(56) References Cited

U.S. PATENT DOCUMENTS

| | | | |
|---|---|---|---|
| 9,507,943 B1* | 11/2016 | Allen | G06F 21/56 |
| 10,033,747 B1* | 7/2018 | Paithane | G06F 21/566 |
| 10,176,325 B1* | 1/2019 | Hou | G06F 21/56 |
| 10,515,214 B1* | 12/2019 | Vincent | G06F 21/562 |
| 2008/0120722 A1 | 5/2008 | Sima et al. | |
| 2012/0030516 A1 | 2/2012 | De Keukelaere et al. | |
| 2012/0260344 A1* | 10/2012 | Maor | A61K 38/1709 |
| | | | 726/25 |
| 2012/0311713 A1* | 12/2012 | Amit | H04L 63/1466 |
| | | | 726/25 |
| 2013/0007887 A1 | 1/2013 | Haviv et al. | |
| 2016/0234246 A1* | 8/2016 | Pistoia | G06F 21/577 |
| 2017/0223043 A1* | 8/2017 | Munoz | H04L 63/20 |

* cited by examiner

METHOD AND APPARATUS FOR GENERATING ATTACK STRING

TECHNICAL FIELD

The present invention relates to a technology for generating an attack string to be executed through a web application and, more specifically, to a method and apparatus for generating an attack string using a string constraint generated by a static analyzer.

BACKGROUND ART

With the growth of web applications' users, the number of web applications being released on the market is skyrocketing. Accordingly, web application security threats are also increasing. A web program may be subjected to insertion of a code that performs a malicious behavior exploiting structural and functional vulnerabilities of the web application. Information leak through web applications is becoming a social problem, and the importance of research to verify a vulnerable web application is increasing.

Methods of verifying web applications may be broadly divided into two types. The first is a method through static analysis. The method is performed by extracting characteristics of a number of web applications through analysis of the web applications and then inspecting the vulnerability of a web application on the basis of the characteristics. The method may be employed as a basic technology on various studies by diversifying the malicious behavior characteristics for a code pattern, a usage right pattern, and the like. However, the method requires generation of reference data whenever a new malicious behavior occurs and has a different analysis result according to the reference data.

The second is a dynamic analysis method that identifies a propagation path and a leak of internal use data by modifying and operating a platform and a web application. According to the method, a propagation flow of data internally used in an operating system and data used in a web application are specifically identified. However, the analysis is performed only in an environment implemented according to a specific purpose, and in a new platform version or a simple filtering, an attack string bypasses the filtering and thus is not recognized, and in order to detect an attack string capable of bypassing the filtering, an additional environment configuration task is needed. Since each of the static method and the dynamic method generally has a merit and a demerit, the two analysis methods are used based on a selection according to the purpose. However, both of the methods have a drawback that a preparation process for the analysis (reference data establishment, environment setting, and the like) takes a long time. In addition, there is a limitation that the result analysis is difficult so the analysis process requires a long time.

DISCLOSURE

Technical Problem

The present invention is directed to providing a method and apparatus for generating an attack string capable of bypassing a preset filtering logic.

The present invention is directed to providing a method and apparatus for analyzing an execution state of a web application based on an attack string.

Technical Solution

One aspect of the present invention provides an operation method of a dynamic analyzer for analyzing an execution state of a web application, the operation method including receiving, from a server, a response message including a final attack string having a parameter that indicates a specific operation to be executed through the web application; analyzing an execution state of the web application based on the final attack string; and determining whether the final attack string is filtered out by the web application on the basis of a result of the analysis on the execution state of the web application, wherein the final attack string is generated to avoid a filtering logic that is designed to filter out a raw attack string including a predetermined parameter.

The operation method may further include transmitting, to the server, a request message requesting that the final attack string be provided, wherein the response message is received in response to the request message.

The determining of whether the final attack string is filtered out by the web application may include determining that the final attack string is not filtered out by the web application when the specific operation indicated by the final attack string is executed through the web application.

The determining of whether the final attack string is filtered out by the web application may include determining that the final attack string is filtered out by the web application when the specific operation indicated by the final attack string is not executed through the web application.

The final attack string may further include a uniform resource locator (URL) address.

The specific operation to be executed through the web application may include at least one of a distributed denial of service (DDoS) attack operation, a cross site scripting phishing (XSS) attack operation, an advanced persistent threat (APT) attack operation, a password cracking attack operation, a keylogging attack operation, a spoofing attack operation, and a rootkit attack operation.

Another aspect of the present invention provides an operation method of a server that generates a final attack string, the operation method including: receiving, from a static analyzer, a first response message including a policy to avoid a filtering logic that is designed to filter out a raw attack string including a predetermined parameter; generating a final attack string including a modified parameter that indicates a specific operation to be executed through the web application such that the final attack string avoids the filtering logic; and transmitting a second response message including the final attack string to a dynamic analyzer.

The operation method may further include transmitting, to the static analyzer, a first request message requesting that a policy to avoid the filtering logic be provided, wherein the first response message may be received in response to the first request message.

The operation method may further include receiving, from the dynamic analyzer, a second request message requesting that the final attack string be provided, wherein the second response message may be transmitted in response to the second request message.

The first response message may further include a URL address and a raw parameter that indicates a specific operation to be executed through the web application.

The final attack string may further include a URL address.

The specific operation to be executed through the web application may include at least one of a DDoS attack operation, an XSS attack operation, an APT attack operation, a password cracking attack operation, a keylogging attack operation, a spoofing attack operation, and a rootkit attack operation.

Another aspect of the present invention provides a server for generating a final attack string, the server including a processor and a database in which at least one command to be executed through the processor is stored, wherein the at least one command is executable to: receive a first response message including a policy to avoid a filtering logic that is designed to filter out a raw attack string including a predetermined parameter from a static analyzer; generate a final attack string including a modified parameter that indicates a specific operation to be executed through the web application such that the final attack string avoids the filtering logic; and transmit a second response message including the final attack string to a dynamic analyzer.

The at least one command may be executable to transmit, to the static analyzer, a first request message requesting that the policy to avoid the filtering logic be provided, wherein the first response message may be received in response to the first request message The first response message may further include a URL address and a raw parameter that indicates a specific operation to be executed through the web application.

The final attack string may further include a URL address.

The specific operation to be executed through the web application may include at least one of a DDoS attack operation, an XSS attack operation, an APT attack operation, a password cracking attack operation, a keylogging attack operation, a spoofing attack operation, and a rootkit attack operation Advantageous Effects According to the present invention, an attack string capable of bypassing a filtering logic can be generated, and an execution state of a web application based on an attack string can be identified. Accordingly, a security vulnerability of a web application which has not been easily detected according to the conventional technology can be detected.

MODES OF THE INVENTION

Figure 1:
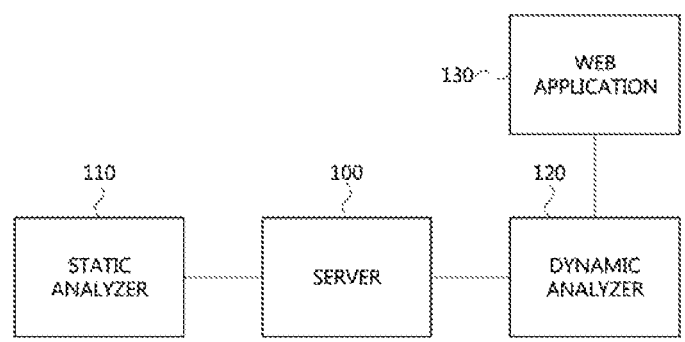
FIG. 1 is a schematic block diagram illustrating a system for analyzing an execution state of a web application based on an attack string according to an embodiment of the present invention.

While the present invention is susceptible to various modifications and alternative embodiments, specific embodiments thereof are shown by way of example in the drawings and will be described. However, it should be understood that there is no intention to limit the present invention to the particular embodiments disclosed, but on the contrary, the present invention is to cover all modifications, equivalents, and alternatives falling within the spirit and scope of the present invention.

It will be understood that, although the terms first, second, etc. may be used herein to describe various elements, the elements should not be limited by the terms. The terms are only used to distinguish one element from another. For example, a first element could be termed a second element, and, similarly, a second element could be termed a first element without departing from the scope of the present invention. As used herein, the term "and/or" includes any one or combination of a plurality of the associated listed items It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms and used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described with reference to the accompanying drawings in detail. For better understanding of the present invention, the same reference numerals are used to refer to the same elements through the description of the figures, and the description of the same elements will be omitted. Hereinafter, example embodiments of the present invention will be described with reference to the accompanying drawings in detail.

FIG. 1 is a schematic block diagram illustrating a system for analyzing an execution state of a web application based on an attack string according to an embodiment of the present invention.

Referring to FIG. 1, the system for analyzing an execution state of a web application based on an attack string may include a server 100, a static analyzer 110, a dynamic analyzer 120, and a device in which a web application 130 is installed. The server 100 may be connected to the static analyzer 110 and the dynamic analyzer 120 via a wired network or a wireless network. For example, the server 100 may communicate with the static analyzer 110 and the dynamic analyzer 120 through long term evolution (LTE), long term evolution-advanced (LTE-A), and the like defined in the 3rd generation partnership project (3GPP) standards. Alternatively, the server 100 may be connected to the static analyzer 110 and the dynamic analyzer 120 by a wireless LAN (WLAN), a wireless personal area network (WPAN), and the like defined in Institute of Electrical and Electronics Engineers (IEEE) standards. Alternatively, the server 100 may be connected to the static analyzer 110 and the dynamic analyzer 120 by a wired LAN and the like.

The server 100 may receive information required for generating a final attack string from the static analyzer 110 and the dynamic analyzer 120 and may generate a final attack string on the basis of the received information. The static analyzer 110 and the dynamic analyzer 120 may transmit information required for software development to the server 100.

The dynamic analyzer 120 may generate the final attack string and transmit the generated final attack string to the device in which the web application 130 is installed.

Figure 2:
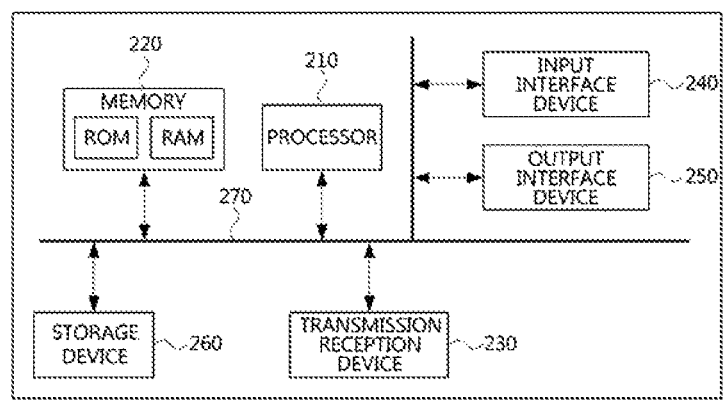
FIG. 2 is a block diagram illustrating a node constituting a system for analyzing an execution state of a web application based on an attack string according to an embodiment of the present invention.

FIG. 2 is a block diagram illustrating a node constituting a system for analyzing an execution state of a web application based on an attack string according to an embodiment of the present invention.

Referring to FIG. 2, the node 200 may include at least one processor 210, a memory 220, and a network interface device 230 connected to a network and performing communication. In addition, the node 200 may further include an input interface device 240, an output interface device 250, a storage device 260, and the like. Here, the node 200 may be the server 100, the static analyzer 110, the dynamic analyzer 120, and the like described above with reference to FIG. 1. Respective components included in the node 200 may be connected to each other by a bus 270 and communicate with each other.

The processor 210 may execute a program command stored in the memory 220 and/or the storage device 260. The processor 210 may refer to a central processing unit (CPU), a graphics processing unit (GPU), or a dedicated processor by which the methods according to the present invention are performed. The memory 220 and the storage device 260 may include a volatile storage medium and/or anon-volatile storage medium. For example, the memory 220 may include a read only memory (ROM) and/or a random-access memory (RAM).

In addition, when a method (transmission or reception of a signal (or a message)) performed by a first node among the nodes is described, a second node corresponding to the first node may perform a method (reception or transmission of a signal (or a message)) corresponding to the method performed by the first node. That is, when an operation of the server 100 is described, the static analyzer 110 and the dynamic analyzer 120 corresponding to the server 100 may perform an operation corresponding to the operation of the server 100. Conversely, when operations of the static analyzer 110 and the dynamic analyzer 120 are described, the server 100 corresponding to the static analyzer 110 and the dynamic analyzer 120 may perform an operation corresponding to the operations of the static analyzer 110 and the dynamic analyzer 120.

Figure 3:
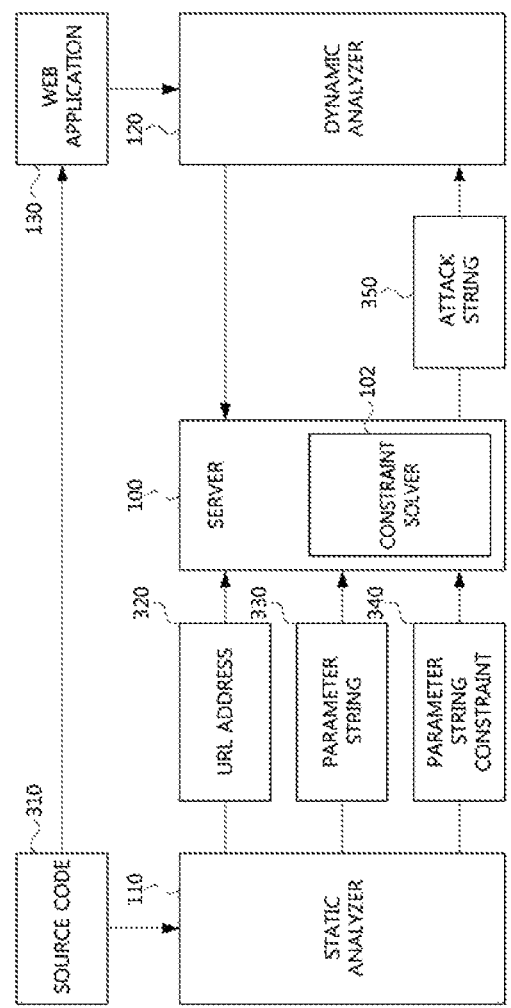
FIG. 3 is a block diagram illustrating an operation of a node constituting a system for analyzing an execution state of a web application based on an attack string according to an embodiment of the present invention.

FIG. 3 is a block diagram illustrating an operation of a node constituting a system for analyzing an execution state of a web application based on an attack string according to an embodiment of the present invention.

Referring to FIG. 3, the system for analyzing an execution state of a web application based on an attack string includes the server 100, the static analyzer 110, the dynamic analyzer 120, the device in which the web application 130 is installed, and the like.

A constraint solver 102 may be included in the server 100. The static analyzer 110 may communicate with a web server, in which a source code 310 of a web application existing on the web is stored, in a wired or wireless communication method. The source code 310 may also be used in a development process of the web application 130. The static analyzer 110 may communicate with the server 100 in a wired and wireless communication method. A uniform resource locator (URL) address 320, a parameter string 330, and a parameter string constraint 340 may be transmitted from the static analyzer 110 to the server 100 through the wired and wireless communication method through which the static analyzer 110 communicates with the server 100. The parameter string 330 may refer to a string that is converted into parameters. In addition, the parameter string 330 may refer to a parameter string used for static analysis. The parameter string constraint 340 may refer to a condition for avoiding a filtering logic designed to filter out a raw attack string.

The constraint solver 102 may be a processor existing in the server 100. The dynamic analyzer 120 may communicate with the server 100 via a wired and wireless communication method. A final attack string 350 may be transmitted from the server 100 to the dynamic analyzer 120 through the wired and wireless communication method connecting the dynamic analyzer 120 to the server 100. The dynamic analyzer 120 may analyze an execution state of the web application 130 installed in the device.

Figure 4:
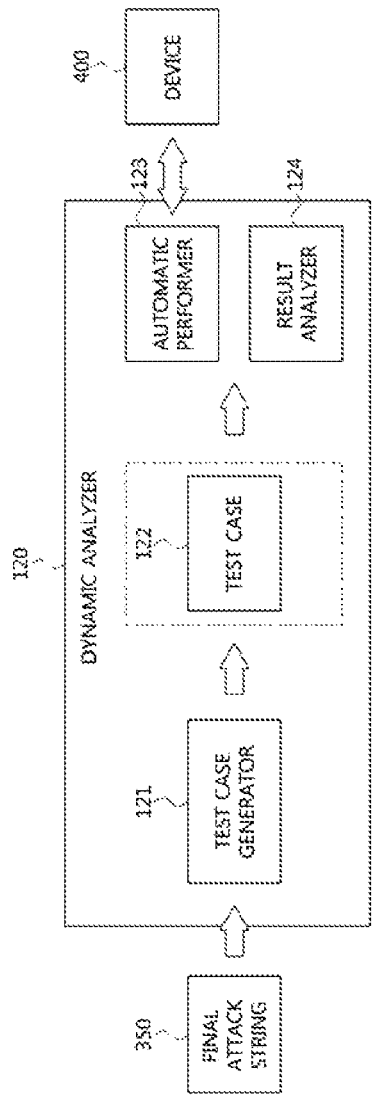
FIG. 4 is a block diagram illustrating a dynamic analyzer according to an embodiment of the present invention.

FIG. 4 is a block diagram illustrating the dynamic analyzer according to an embodiment of the present invention.

Referring to FIG. 4, the dynamic analyzer 120 may include a test case generator 121, an automatic performer 123, a result analyzer 124, and the like.

The dynamic analyzer 120 may receive the final attack string 350 and use the received final attack string 350 for dynamic analysis. The automatic performer 123 may communicate with a device 400 in a wired and wireless communication method. The device 400 may support dynamic analysis by installing a web application desired to be verified therein.

The test case generator 121 may generate a test case 122 in a different form according to a test purpose.

The automatic performer 123 may automatically perform a command, which may be performed by the test case generator 121, and serve to install and uninstall a web application. The result analyzer 124 may collect pieces of information to generate a spreadsheet file and may be expanded and modified according to the format to be output.

Figure 5:
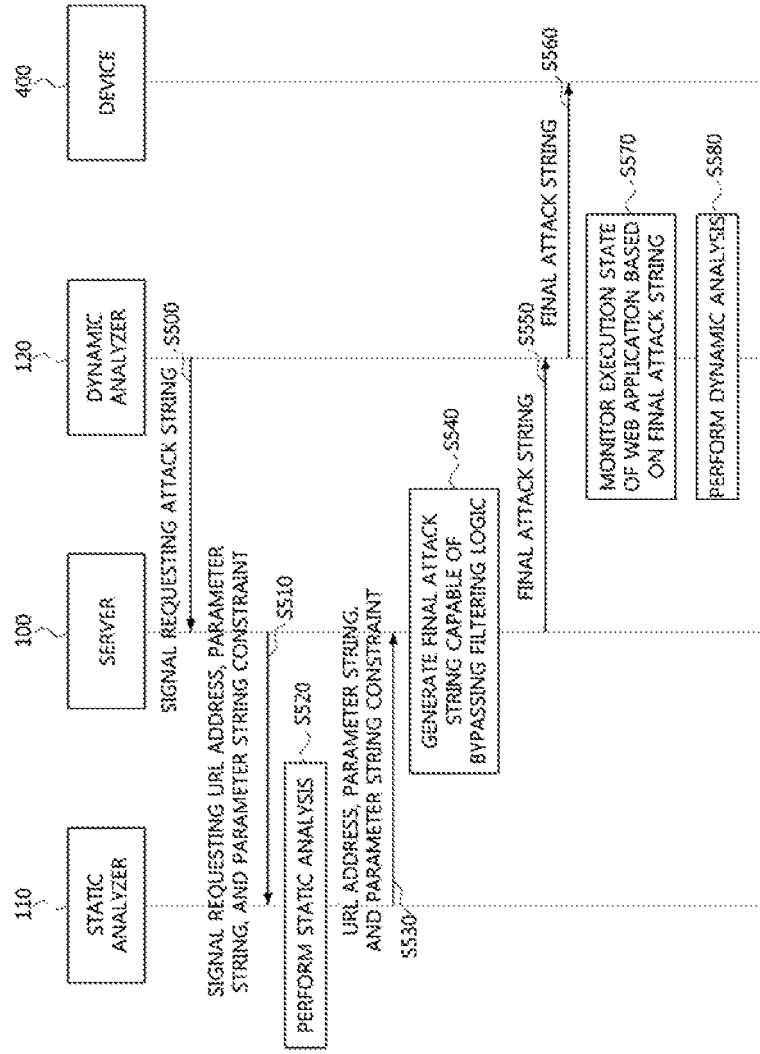
FIG. 5 is a flowchart showing a method of analyzing an execution state of a web application based on an attack string according to an embodiment of the present invention.

FIG. 5 is a flowchart showing a method of analyzing an execution state of a web application based on an attack string according to an embodiment of the present invention.

Referring to FIG. 5, the dynamic analyzer 120 may transmit a signal (or a message) requesting a final attack string including a parameter indicating a specific operation to be executed through a web application to the server 100 (S500). The final attack string including the parameter indicating the specific operation to be executed through the web application may bypass a filtering logic that may filter out the final attack string if the final attack string is a raw attack string.

Upon receiving the signal (or message) requesting the final attack string, the server 100 may transmit a signal (or message) requesting a URL address, a parameter string, and a parameter string constraint to the static analyzer 110 (S510).

The URL address may refer to an Internet address used for Internet access, and the parameter may indicate a specific operation to be executed through the web application. The parameter string may refer to parameters converted into a string. The parameter string constraint may refer to a condition for avoiding a filtering logic designed to filter out a raw attack string.

The dynamic analyzer 120 may perform dynamic analysis on the basis of a raw attack string that refers to a general attack string. Since a raw attack string generally has a rule in the parameter string, an attack of the raw attack string may be easily avoided by a simple filtering (e.g., replacing a front part and a rear part of a parameter string or duplicating a character).

The static analyzer 110, upon receiving the signal (or message) requesting the URL address, the parameter string, and the parameter string constraint, may perform static analysis by obtaining a web application source code and analyzing characteristics from the obtained web application source code (S520).

The static analysis may be performed as follows.

Figure 6:
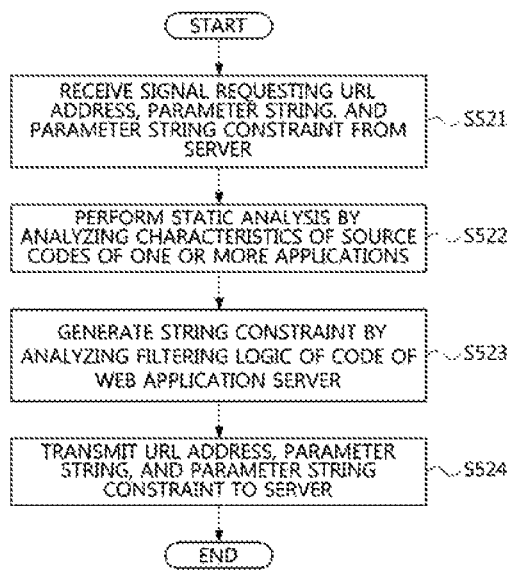
FIG. 6 is a flowchart showing a method of performing static analysis according to an embodiment of the present invention.

FIG. 6 is a flowchart showing a method of performing static analysis according to an embodiment of the present invention.

Referring to FIG. 6, the static analyzer 110 may receive a signal (or message) requesting a URL address, a parameter string, and a parameter string constraint from the server 100 (S521). The static analyzer 110 may analyze characteristics of source codes of a plurality of web applications.

The static analyzer 110 may perform static analysis by analyzing characteristics of source codes of one or more web applications and identifying the source codes. The static analyzer 110 may generate static analysis information through the static analysis performed (S522).

An execution server side code that executes the web application typically has a filtering logic to avoid a raw attack string. The static analyzer 110 may identify how the filtering logic has been generated by analyzing the filtering logic. In the analyzing and identifying of the filtering logic by the static analyzer 110, the static analyzer 110 may obtain a URL address, a parameter string, and a constraint of a parameter string including a filtering logic (S523). The static analyzer 110 may transmit the URL address, the parameter string, and the constraint of the parameter string obtained through the static analysis to the server 100 (S524).

Referring again to FIG. 5, the static analyzer 110 may transmit the URL address, the parameter string, and the parameter string constraint obtained through the static analysis to the server 100 (S530).

The static analyzer 110, upon receiving a signal requesting a final attack string including a parameter indicating a specific operation to be executed through a web application from the dynamic analyzer 120, may transmit a URL address, a parameter string, and a parameter string constraint, which are obtained through static analysis in advance, to the server 100.

The server 100 may receive the URL address, the parameter string, and the parameter string constraint. The server 100 may generate a final attack string using the constraint solver that is configured to generate a final attack string on the basis of a constraint (S540).

A raw attack string may consist of a URL address and a raw parameter, and a final attack string may consist of a URL address and a modified parameter. The raw attack string may refer to an arbitrary attack string. The constraint solver of the server 100 may generate a final attack string capable of bypassing a filtering logic, which is configured to filter out a raw attack string, on the basis of the URL address, the parameter string, and the parameter string constraint.

The server 100 may transmit the final attack string generated by the constraint solver of the server 100 to the dynamic analyzer 120 (S550). The dynamic analyzer 120 may receive the final attack string from the server 100. Upon receiving the final attack string, the dynamic analyzer 120 may transmit the final attack string to the device 400 having a web application for which dynamic analysis is desired (S560).

The dynamic analyzer 120 may perform dynamic analysis by performing a specific operation on the device 400 having the web application for which dynamic analysis is desired. The specific operation performed through the web application may include at least one of a distributed denial of service (DDoS) attack operation, an advanced persistent threat (APT) attack operation, a password cracking attack operation, a keylogging attack operation, a spoofing attack operation, and a rootkit attack operation.

The device 400 may represent an execution state of the web application based on the final attack string. The dynamic analyzer 120 may monitor the execution state of the web application based on the final attack string by the device 400 (S570). The dynamic analyzer 120 may receive an operation based on the final attack string from the device 400. The dynamic analyzer 120 may perform dynamic analysis on the basis of the operation based on the final attack string received from the device 400 (S580). The dynamic analysis method may be performed as follows.

Figure 7:
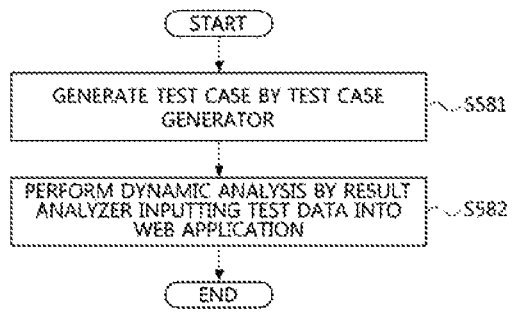
FIG. 7 is a flowchart showing a method of performing dynamic analysis according to an embodiment of the present invention.

FIG. 7 is a flowchart showing a method of performing dynamic analysis according to an embodiment of the present invention.

Referring to FIG. 7, the test case generator may generate a test case (S581).

The result analyzer may analyze what is vulnerable in a web application by inputting text data into the web application (S582). The text data may refer to a parameter value inputted in a URL address. The parameter value may be a final attack string generated on the basis of a constraint through static analysis.

When the result obtained through the analysis is that a specific operation indicated by the final attack string is executed through the web application, it may be determined that the final attack string is not filtered out by the web application. When the result obtained through the analysis is that the specific operation indicated by the final attack string is not executed through the web application, it may be determined that the final attack string is filtered out by the web application.

The specific operation performed through the web application may include at least one of a DDoS attack operation, an APT attack operation, a password cracking attack operation, a keylogging attack operation, a spoofing attack operation, and a rootkit attack operation.

The methods according to the present invention may be implemented in the form of program commands executable by various computer devices and may be recorded in a computer readable media. The computer readable media may be provided with program commands, data files, data structures, and the like alone or in a combination thereof. The program commands stored in the computer readable media may be those specially designed and constructed for the purposes or may be of the kind well-known and available to those having skill in the computer software arts.

Examples of the computer readable storage medium include a hardware device constructed to store and execute a program command, for example, a ROM, a RAM, and a flash memory. The program command may include a high-level language code executable by a computer through an interpreter in addition to a machine language code made by a compiler. The described hardware devices may be configured to act as one or more software modules in order to perform the operations of the present invention, or vice versa.

While the example embodiments of the present invention and their advantages have been described in detail, it should be understood that various changes, substitutions and alterations may be made herein without departing from the scope of the present invention.

The invention claimed is:

1. An operation method of a dynamic analyzer for analyzing an execution state of a web application, the operation method comprising:
   transmitting, to a server, a request message requesting that a final attack string be provided, wherein a response message is received in response to the request message, wherein the server transmits a first request message to a static analyzer upon receiving the request message from the dynamic analyzer, the first request message requesting a uniform resource locator (URL) address, a parameter string, and a parameter string constraint, wherein the parameter string refers to a string into which the parameter is converted, wherein the static analyzer performs static analysis by obtaining a web application source code, analyzes characteristics from the obtained web application source code, and generates the parameter string constraint including a filtering logic, and wherein the server receives, from the static analyzer, a first response message including the URL address, the parameter string and the parameter string constraint;
   receiving, from the server, the response message including the final attack string having a parameter that indicates a specific operation to be executed through the web application;
   transmitting the final attack string to a device in which the web application is installed;
   analyzing an execution state of the web application based on the final attack string; and
   determining whether the final attack string is filtered out by the web application on the basis of a result of the analysis on the execution state of the web application,
   wherein the final attack string is generated by the server to avoid the filtering logic that is designed to filter out a raw attack string including a predetermined parameter.

2. The operation method of claim 1, wherein the specific operation to be executed through the web application includes at least one of a distributed denial of service (DDoS) attack operation, a cross site scripting phishing (XSS) attack operation, an advanced persistent threat (APT) attack operation, a password cracking attack operation, a keylogging attack operation, a spoofing attack operation, and a rootkit attack operation.

3. An operation method of a server that generates a final attack string, the operation method comprising:
   receiving, from a dynamic analyzer, a message requesting a final attack string that includes a parameter indicating a specific operation to be executed through a web application;
   transmitting, to a static analyzer, a first request message requesting a uniform resource locator (URL) address, a parameter string, and a parameter string constraint, wherein the parameter string refers to a string into which the parameter is converted, and wherein the static analyzer performs static analysis by obtaining a web application source code, analyzes characteristics from the obtained web application source code, and generates the parameter string constraint including a filtering logic;
   receiving, from the static analyzer, a first response message including the URL address, the parameter string and the parameter string constraint having a filtering logic that is designed to filter out a raw attack string including a predetermined parameter;
   generating the final attack string including a modified parameter that indicates a specific operation to be executed through the web application such that the final attack string avoids the filtering logic;
   transmitting the final attack string to the dynamic analyzer,
   wherein the dynamic analyzer transmits the final attack string to a device in which the web application is installed, and analyzes an execution state of the web application installed in the device based on the final attack string.

4. The operation method of claim 3, wherein the specific operation to be executed through the web application includes at least one of a distributed denial of service (DDoS) attack operation, a cross site scripting phishing (XSS) attack operation, an advanced persistent threat (APT) attack operation, a password cracking attack operation, a keylogging attack operation, a spoofing attack operation, and a rootkit attack operation.

5. A server for generating a final attack string, the server comprising:
   a processor; and
   a database in which at least one command to be executed through the processor is stored,
   wherein the at least one command is executable to:
      receive, from a dynamic analyzer, a message requesting a final attack string that includes a parameter indicating a specific operation to be executed through a web application;
      transmit, to a static analyzer, a first request message requesting a uniform resource locator (URL) address, a parameter string, and a parameter string constraint, wherein the parameter string refers to a string into which the parameter is converted, and wherein the static analyzer performs static analysis by obtaining a web application source code, analyzes characteristics from the obtained web application source code, and generates the parameter string constraint including a filtering logic;
      receive a first response message including a policy to avoid the URL address, the parameter string and the parameter string constraint having a filtering logic that is designed to filter out a raw attack string including a predetermined parameter from the static analyzer;
      generate the final attack string including a modified parameter that indicates a specific operation to be executed through a web application such that the final attack string avoids the filtering logic;
      transmit the final attack string to the dynamic analyzer, wherein the dynamic analyzer transmits the final attack string to a device in which the web application is installed, and analyzes an execution state of the web application installed in the device based on the final attack string.

6. The server of claim 5, wherein the specific operation to be executed through the web application includes at least one of a distributed denial of service (DDoS) attack operation, a cross site scripting phishing (XSS) attack operation, an advanced persistent threat (APT) attack operation, a password cracking attack operation, a keylogging attack operation, a spoofing attack operation, and a rootkit attack operation.

* * * * *